US006568379B2

United States Patent
Larsen

(10) Patent No.: US 6,568,379 B2
(45) Date of Patent: May 27, 2003

(54) METHOD OF GASOLINE ASSISTED GASEOUS FUEL ENGINE STARTING

(75) Inventor: John F Larsen, Campbellcroft (CA)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/888,312

(22) Filed: Jun. 25, 2001

(65) Prior Publication Data

US 2003/0000509 A1 Jan. 2, 2003

(51) Int. Cl.[7] .............................................. F02B 13/00
(52) U.S. Cl. ..................................................... 123/575
(58) Field of Search ............................. 123/575, 491, 123/525, 526, 529, 27 LE

(56) References Cited

U.S. PATENT DOCUMENTS

| 4,546,732 A | * | 10/1985 | Mae et al. .................... 123/1 A |
| 6,026,787 A | * | 2/2000 | Sun et al. ...................... 123/525 |
| 6,105,561 A | * | 8/2000 | Ferrera et al. ............ 123/179.8 |
| 6,169,942 B1 | * | 1/2001 | Miller et al. .................... 60/248 |

* cited by examiner

Primary Examiner—Henry C. Yuen
Assistant Examiner—Hyder Ali
(74) Attorney, Agent, or Firm—Christopher DeVries

(57) ABSTRACT

A bi-fuel engine has a gaseous fuel mode engine start strategy that delivers a calibrated amount of supplemental gasoline during engine starting and initial gaseous fuel engine runs. The strategy is embodied in an algorithm employing variables including start of supplemental gasoline fueling, end of supplemental gasoline fueling, ramp-in period of supplemental gasoline fueling, ramp-out period of supplemental gasoline fueling, and the fraction of supplemental gasoline fuel to be delivered relative to that which is normally delivered during a conventional gasoline start. The algorithm differentiates between hot and cold engine starts for determining how much supplemental gasoline is to be delivered during gaseous fuel starts, wherein hot starts occur before substantially complete diffusion of gaseous fuel in the intake system, and cold starts occur after diffusion of gaseous fuel in the intake system is substantially complete. Time required for substantially complete diffusion depends on geometry of the intake system. The gaseous fuel start strategy allows for modification (i.e. calibration) of criteria used for hot and cold start determination for different vehicles.

14 Claims, 5 Drawing Sheets

METHOD OF GASOLINE ASSISTED GASEOUS FUEL ENGINE STARTING

TECHNICAL FIELD

The present invention relates to improvements in bi-fuel engines that alternatively use gasoline or gaseous fuels, and particularly to enhanced starting performance, i.e. decrease in engine start times for gaseous fuel starts that follow gasoline engine operation, and improved start consistency for gaseous fuel starts that follow gaseous fuel engine operation.

BACKGROUND OF THE INVENTION

In a bi-fuel engine utilizing the combination of a) a gaseous fuel throttle body induction fueling strategy for delivery of gaseous fuel, such as compressed natural gas, and b) port fuel injection for delivery of gasoline fuels, certain shortcomings plague normal performance of the gaseous fuel operational mode. In particular, long starting times are generally associated with gaseous fuel starts following gasoline engine operation. The long starting times are attributable to the delivery of gaseous fuels upstream of the throttle body. In such cases there is a considerable delay (i.e. as much as three to four seconds) associated with engine starting times as a result of normal time for transport of gaseous fuel from fuel metering devices to the engine cylinders.

Moreover, inconsistent start quality has been associated with gaseous fuel starts following gaseous fuel engine runs. When the engine is shut down following gaseous fuel operation, a significant quantity of residual, unburned fuel may remain trapped in the intake system between the point of fuel introduction and the engine. While the engine is off, the gaseous fuel slowly bleeds out of the intake system. The quality and consistency of subsequent starts can vary considerably, depending on how long the engine has been off; i.e. how much of the gaseous fuel has bled out of the intake system.

One major drawback of prior art systems has been a lack of control of amounts of gasoline used to reduce gaseous fuel starting times. In some bi-fuel engine systems wherein gasoline has been used during starting, the starting has been difficult to control at best, as such systems have not been programmed to include robust pulse width control. In addition, such systems have lacked accommodation for soak times.

SUMMARY OF THE INVENTION

This invention provides a gasoline assisted gaseous fuel start strategy or method to address the aforementioned issues by providing a calibratable quantity of supplemental gasoline to be delivered during gaseous fuel engine starting and initial engine run. In one preferred form, the method employs a series of calibration tables that address and facilitate control of the following parameters: start of supplemental gasoline fueling, end of supplemental gasoline fueling, ramp-in period of supplemental gasoline fueling, ramp-out period of supplemental gasoline fueling, and the fraction of supplemental gasoline fuel to be delivered relative to the quantity of gasoline that would normally be delivered during a conventional gasoline start.

The method also involves differentiation between hot and cold starts for determining how much supplemental gasoline is to be delivered during gaseous fuel starts. As defined in this invention, a "cold start" refers to a start that occurs after diffusion of residual gaseous fuel in the intake system is deemed to be substantially complete, while a "hot start" refers to a start that occurs before substantially complete diffusion of residual gaseous fuel in the intake system. The time required for substantially complete diffusion of residual gas depends on the geometry of any given intake system. The gasoline assisted gaseous fuel start strategy of this invention provides a means to modify (i.e. calibrate) the criteria used for hot and cold start determination so that the method can be readily applied to different vehicles.

Another feature embodied by the method is actual calibration of the quantity of supplemental gasoline fueling based on the fuel type used for the previous engine operating cycle. This is important because for gaseous fuel starts that follow gasoline engine operations, the intake system does not contain any significant quantity of residual fuel. For gaseous fuel starts following gaseous fuel engine operation, the intake system may contain a considerable quantity of residual fuel depending on how long the engine has been shut down.

Use of the gasoline assisted gaseous fuel start strategy of this invention makes it possible to sufficiently enrich the air-fuel ratio in the intake system, over a wide range of conditions, to provide consistent gaseous fuel start performance. Application of the strategy to a compressed natural gas (CNG) bi-fuel vehicle demonstrated reduced starting times, and improved consistency of gaseous fuel starts. For specific instances where CNG bi-fuel vehicles were started on CNG following gasoline operations, start times were reduced from 3–4 seconds to about 0.5 seconds under the strategy of this invention.

DESCRIPTION OF THE PREFERRED EMBODIMENT

Figure 1:
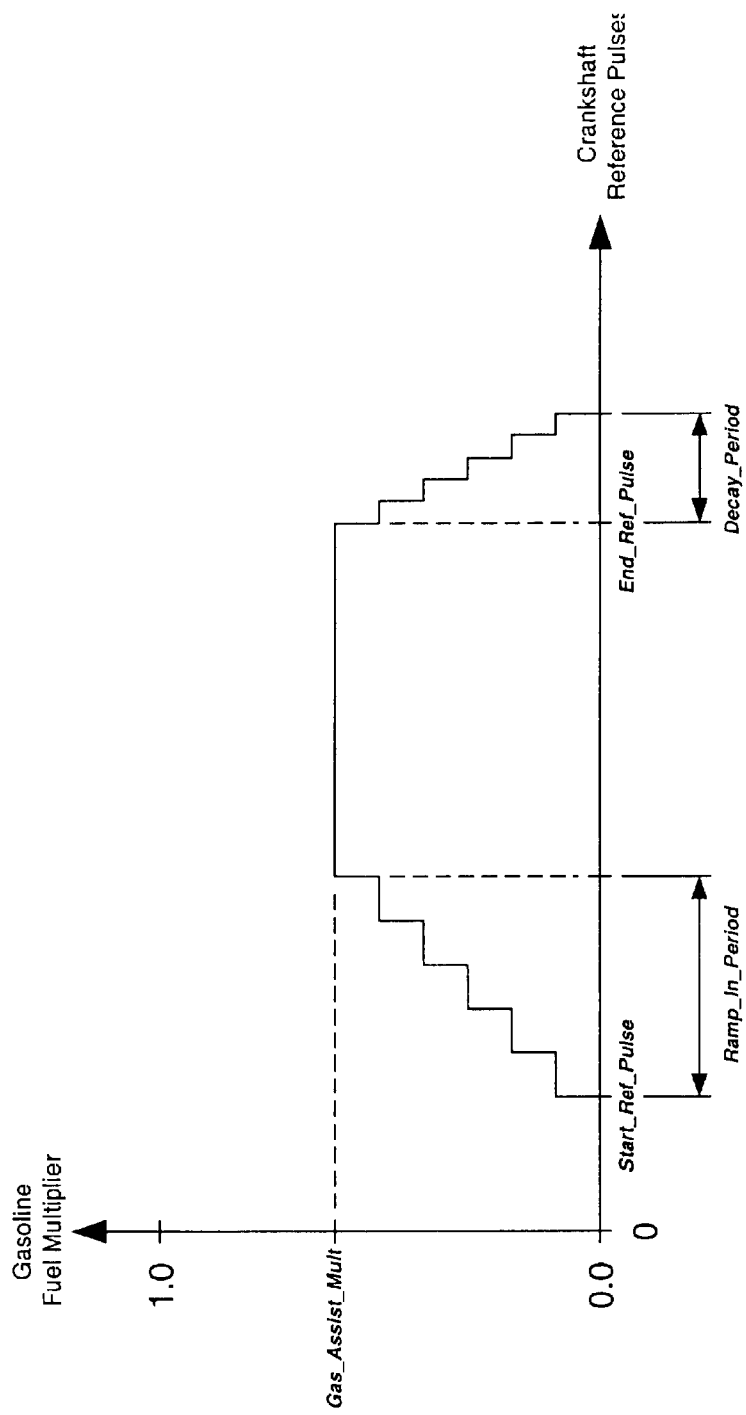
FIG. 1 is a graphical depiction of supplemental gasoline fuel delivery, demonstrating that some fraction of the normal amount of gasoline fuel is to be applied during the starting cycle of a gaseous fuel start, where the normal amount is that calibrated for a full gasoline fuel start in a given bi-fuel engine.

The following terms and definitions will be used herein as follows:

Injector Pulse Width: amount of time, measured in microseconds for how long gasoline fuel injectors stay open per spray; actual amount of spray depends on fuel pressure for a given injector pulse width.

Start_Ref_Pulse: the crankshaft reference pulse, as measured from the start of engine crank, at which supplemental gasoline fuel injection begins.

Ramp_In_Period:—period measured from Start_Ref_Pulse during which supplemental gasoline fueling is ramped from a pulse width of zero to a calibratable fraction (Gas_Assist_Mult) of the pulse width that would normally be commanded during a conventional gasoline start.

Decay_Period:—period measured from End_Ref_Pulse during which supplemental gasoline fueling is decayed from a calibratable fraction (Gas_Assist_Mult) of the pulse width that would normally be commanded during a conventional gasoline start to a pulse width of zero.

End_Ref_Pulse:—the crankshaft reference pulse at which supplemental gasoline fueling decay begins.

Normal_PW—the gasoline fuel injector pulse width (PW) that would normally be delivered during a conventional gasoline start.

Gas_Assist_Mult:—fraction of the supplemental gasoline fuel to be delivered during a gasoline assisted gaseous fuel start relative to the quantity of gasoline that would normally be delivered during a conventional gasoline start.

Engine_Run_Flag—this flag is set if the engine is currently running, and is clear if the engine is not running (e.g. if a stall has occurred or the engine is starting).

Gaseous_Fuel_Mode_Flag—this flag is set if the ECM software has determined that the engine should be started and run on the gaseous fuel. This flag is clear if the ECM software has determined that the engine should be started and run on gasoline fuel.

Stall_Onset_Flag—this flag is set if the onset of an engine stall has been detected, and is otherwise clear.

Last_Engine_Run_Used_Gasoline_Flag—this flag is set if the engine was last operated on gasoline fuel and is clear if the engine was last operated on gaseous fuel.

False_Start_Disable_Flag—this flag is set if a false start[1] has been detected and the ECM has determined that it is desirable to disable supplemental gasoline fueling following detection of a false start.

Barometric_Pressure—barometric pressure as determined by the ECM software.

Curr_Ref_Pulse—the number of accumulated crankshaft reference pulses since the start of engine crank.

Start_Up_Coolant_Temperature—the coolant temperature of the vehicle at the start of engine crank. This variable is continuously updated until the engine has started.

Soak_Time—length of time that the engine has been shut off since the last operating cycle.

(Definitions of other terms or expressions employed herein are self-explanatory.)

The hereindescribed invention contemplates that the gasoline assisted gaseous fuel start strategy or method be incorporated as a software algorithm in a conventional engine control module (ECM) to improve gaseous fuel start performance of a bi-fuel vehicle. Once integrated into the ECM software, the algorithm is preferably executed at the same frequency as normal gasoline fuel injector pulse width calculations to insure that all supplemental gasoline fueling parameters are commensurately updated prior to each fuel injection event.

The desired output of the strategy is a calibrated fuel injector pulse width for supplemental gasoline fueling during gaseous fuel starts. The basic premise of the strategy is depicted in FIG. 1, which graphically illustrates how the algorithm controls the quantity of supplemental gasoline fuel delivered during a gaseous fuel start. The x-axis, labeled "Crankshaft Reference Pulses", represents the number of crankshaft reference pulses that have accumulated since the start of engine crank. The y-axis, labeled "Gasoline Fuel Multiplier", represents the fraction of gasoline fuel delivered during a gaseous fuel start relative to the injector pulse width of a conventional gasoline start, where the value "1" represents the amount of fuel supplied for a normal gasoline start for a given bi-fuel engine.

Supplemental gasoline fueling is started when the number of accumulated crankshaft reference pulses is equal to Start_Ref_Pulse and is ramped-in over a period of crankshaft reference pulses equal to Ramp_In_Period. Supplemental gasoline fueling ends when the number of accumulated crankshaft reference pulses is equal to End_Ref_Pulse and is ramped-out over a period of crankshaft reference pulses equal to Decay_Period. The pulse width of supplemental gasoline fuel injections is thus limited to a fraction of Gas_Assist_Mult relative to the pulse width that would normally be commanded during a conventional gasoline start.

Figure 2:
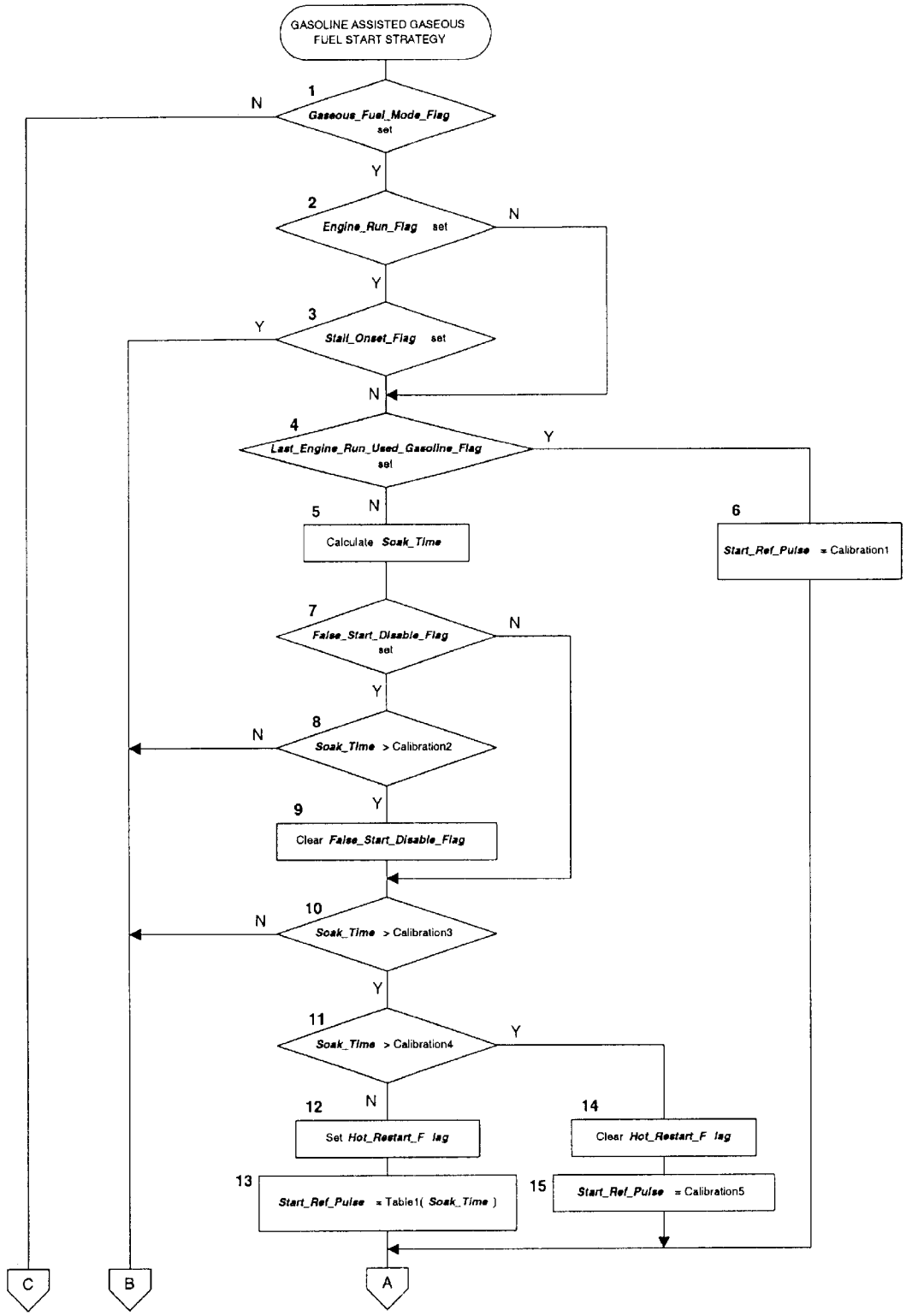
FIGS. 2–5 are a four-page flowchart displaying a gasoline assisted gaseous fuel start strategy as embodied in one preferred method of the present invention.
Figure 3:
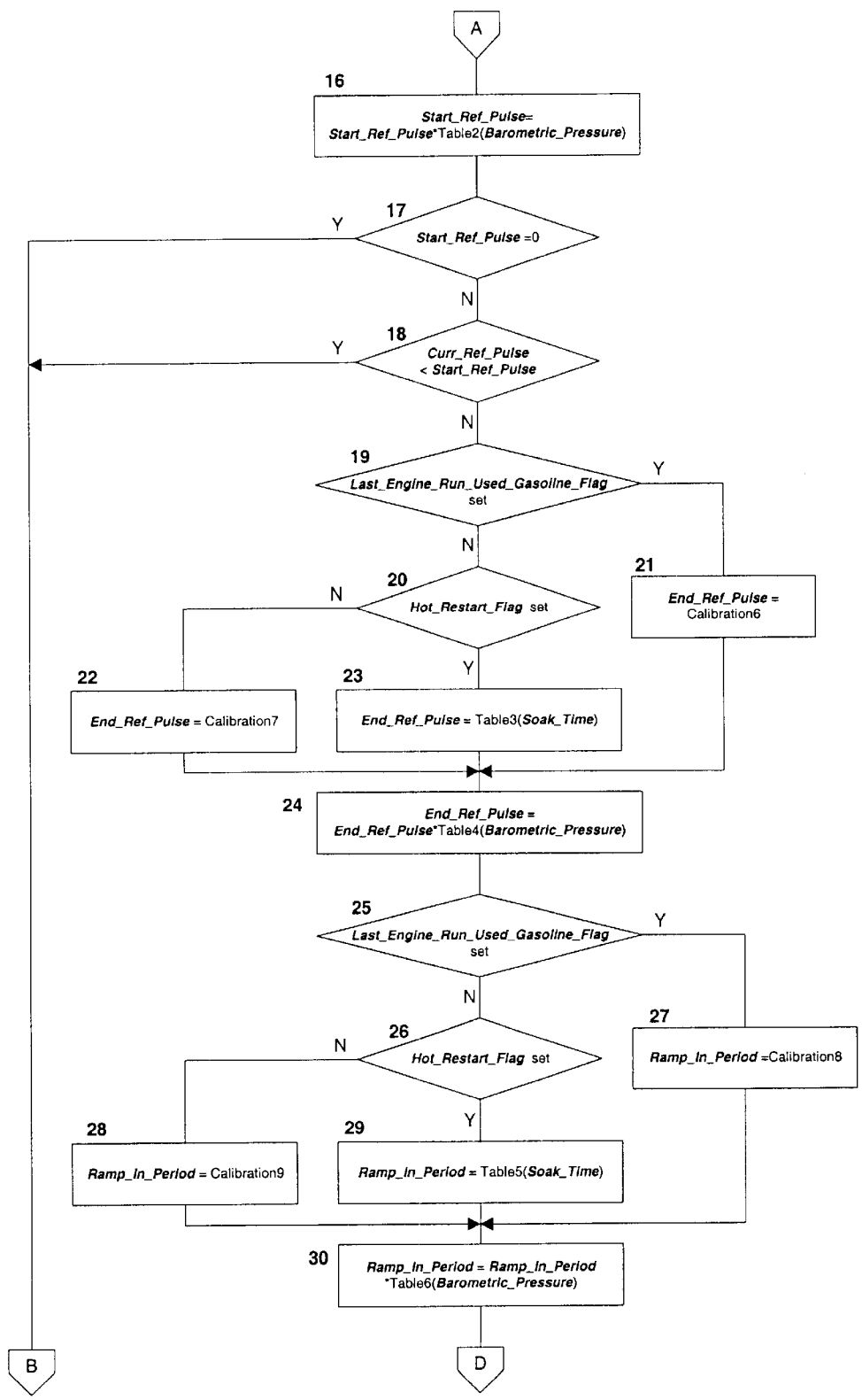
Figure 4:
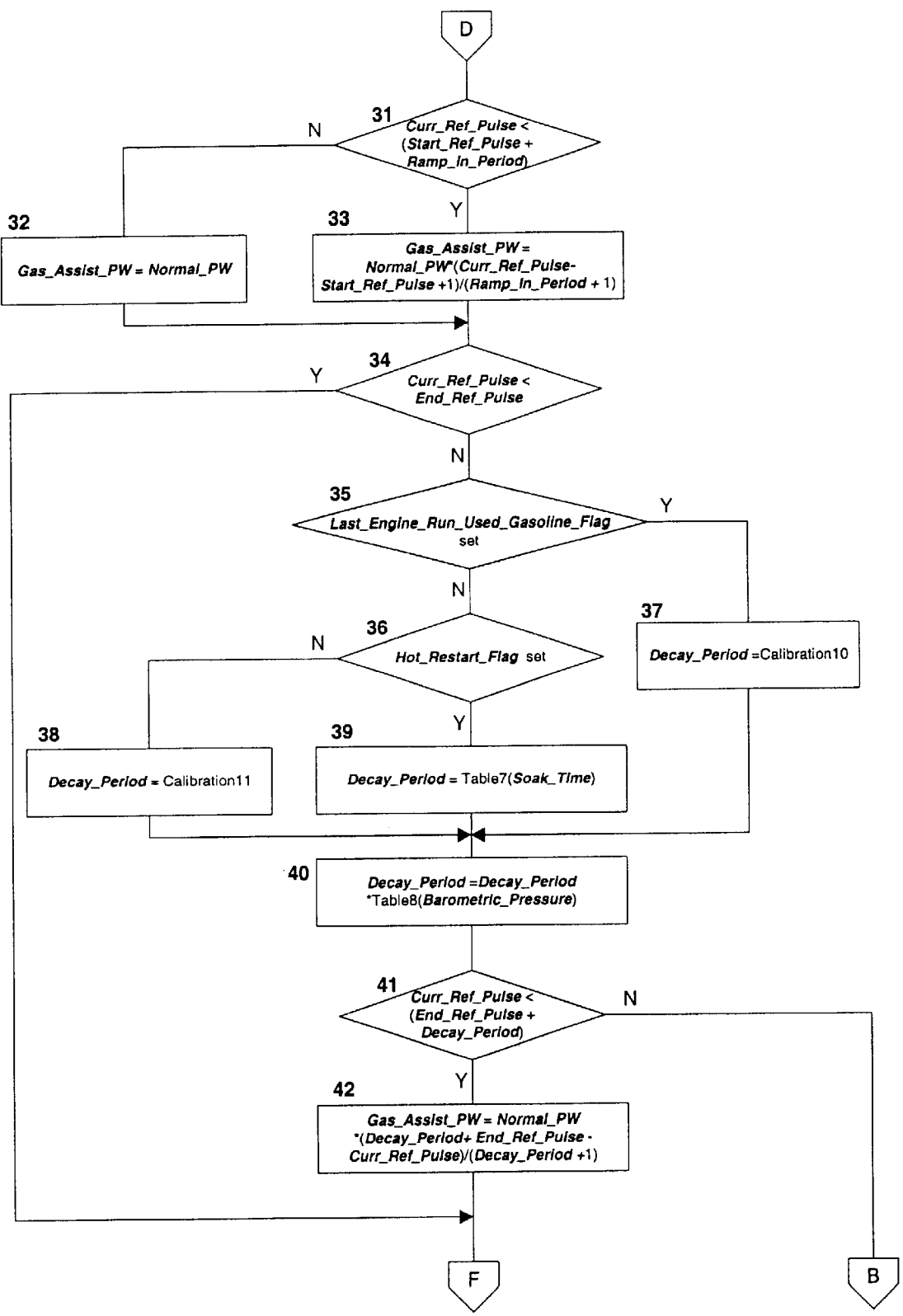
Figure 5:
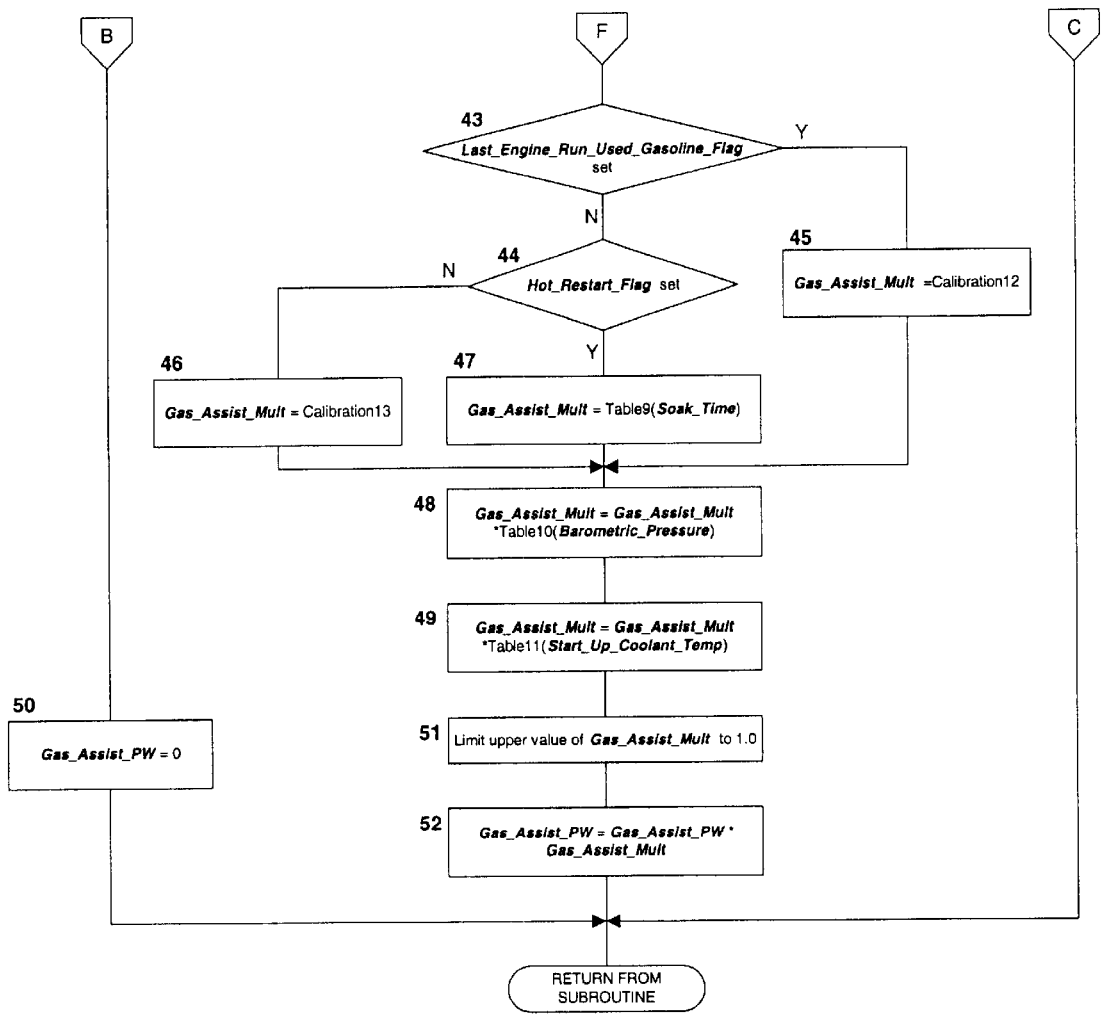

A detailed application of one preferred method of the strategy of the present invention is presented in the flow diagram of FIG. 2. In all cases it is assumed that all relevant variables have been updated by the ECM software prior to any given algorithm execution.

The primary output of the algorithm is the variable Gas_Assist_PW, which is the fuel injector pulse width used to control the gasoline fuel injectors during a gaseous fuel start. The algorithm cycle is initiated by a first check of the state of the Gaseous_Fuel_Mode_Flag at Decision 1. If the ECM has determined that the engine should be operated on gaseous fuel (i.e. the flag is set), execution proceeds to Decision 2. If the Gaseous_Fuel_Mode_Flag is clear (i.e. if the ECM has determined that the engine is to be operated on gasoline fuel, the algorithm is exited. At Decision 2, the Engine_Run_Flag is tested. If the flag is set, indicating that the engine is currently running, execution proceeds to Decision 3 where the Stall_Onset_Flag is evaluated. If the Stall_Onset_Flag is set, indicating that an engine stall is imminent, program execution jumps to Task 50 where Gas_Assist_PW is set to 0, and the algorithm is exited. It may not always be desirable to include Decision 3 as part of the fuel start strategy if there is uncertainty surrounding the likely cause of stall onset. The inclusion of Decision 3 in FIG. 2 assumes that the algorithm is calibrated such that there is a high degree of certainty that pending stalls would normally be the result of an over-rich air-fuel ratio. In such a case, shutting off supplemental gasoline fueling (i.e. setting Gas_Assist_PW to zero) increases the chance of recovering from a pending stall.

Calculation of the start of supplemental gasoline fueling, which is represented by the Start_Ref_Pulse variable, begins with Decision 4. If the engine was last operated on gasoline (i.e. the Last Engine_Run_Used_Gasoline_Flag is set), Task 6 assigns Start_Ref_Pulse a value of Calibration 1 and program execution proceeds to Task 16. If the engine was last operated on the gaseous fuel, the Soak_Time is calculated by Task 5.

For ECMs capable of operating a timer while the vehicle ignition is off, the Soak_Time will be simply the accumulated value of a timer that was started when the ignition was turned off, and then halted upon detection of subsequent engine starting. For ECMs not capable of operating a timer with the ignition off, an estimate of Soak_Time can be made based on the difference between coolant temperature when the engine was shut down and coolant temperature when subsequent engine starting is detected.

If the ECM software has determined that supplemental gasoline fueling should be disabled due to detection of a false start, as indicated by the state of the False_Start_Disable_Flag in Decision 7, the Soak_Time is compared to Calibration 2. False starts can result in the formation of an excessively rich air-fuel ratio in the intake system. Calibration 2 provides a means to disable supplemental gasoline fueling until sufficient time has been allowed for dilution of the air-fuel mixture in the intake system. If the Soak_Time is greater than Calibration 2, enough time is deemed to have elapsed since the false start to re-enable supplemental gasoline fueling, and the False_Start_Disable_Flag is cleared (Task 9). Execution proceeds then to Task 10. If enough time has not elapsed since the detection of the false start, Gas_Assist_PW is set to zero (Task 50), and the algorithm is exited.

At Decision 10, Soak_Time is compared to Calibration 3. Immediately after shutting off the engine following gaseous fuel operation, the air-fuel mixture in the intake system is normally close to stoichiometric. Until some of the gaseous fuel has bled out of the intake system, it may not be desirable to enable supplemental gasoline fueling for a subsequent re-start. Calibration 3 is used to disable supplemental gasoline fueling until sufficient time has elapsed to warrant fueling enrichment during a gaseous fuel start. While Soak_Time is less than or equal to Calibration 3, Gas_Assist_PW is set to zero (Task 50), and the algorithm is exited. If Soak_Time is greater than Calibration 3, program execution proceeds to Decision 11.

The purpose of Decision 11 is to categorize the gaseous fuel start as hot or cold. Within the context of this document, a "cold start" refers to a start that occurs after diffusion of residual gaseous fuel in the intake system is deemed to be substantially complete, while a "hot start" refers to a start that occurs before substantially complete diffusion of residual gaseous fuel in the intake system. If Soak_Time is greater than Calibration 4, the residual gaseous fuel is deemed to have sufficiently diffused, the Hot_Restart_Flag is cleared (Task 14) and Start_Ref_Pulse is assigned a value of Calibration 5 (Task 15). If Soak_Time is less than or equal to Calibration 4, the Hot_Restart_Flag is set (Task 12), and Start_Ref_Pulse is assigned an entry from Table 1, based on the value of Soak_Time.

At Task 16, the value of Start_Ref_Pulse is finalized by applying a multiplier, obtained from Table 2, which is based on barometric pressure:

$$\text{Start\_Ref\_Pulse} = \text{Start\_Ref\_Pulse} \times \text{Table 2(Barometric\_Pressure)}$$

At Decision 17, the value of Start_Ref_Pulse is checked. If Start_Ref_Pulse=0, Gas_Assist_PW is set to zero (Task 50), and the algorithm is exited. The check at Decision 17 allows the supplemental gasoline fueling to be selectively disabled. For example, if Calibration 1 is zero, and Calibration 5, Table 1 and Table 2 contain non-zero values, supplemental gasoline fueling will only be disabled for gaseous fuel starts that follow gasoline engine operation. Similarly, supplemental gasoline fueling can be disabled for specific values of Soak_Time, or a range of Soak_Time, by zeroing the corresponding Table 1 entry or entries. Supplemental gasoline fueling can also be disabled at specific altitudes (i.e. barometric pressures) by zeroing entries in Table 2.

The calculated value of Start_Ref_Pulse is compared to the current crankshaft reference pulse (Curr_Ref_Pulse) at Decision 18. If Curr_Ref_Pulse is less than Start_Ref_Pulse, Gas_Assist_PW is set to zero (Task 50), and the algorithm is exited. If Curr_Ref_Pulse is greater than or equal to Start_Ref_Pulse, algorithm execution proceeds to Decision 19.

Calculation of the end point for supplemental gasoline fueling (End_Ref_Pulse) begins at Decision 19 with the evaluation of the Last_Engine_Run_Used_Gasoline_Flag. If the flag is set, indicating that the engine was last operated on gasoline, End_Ref_Pulse is assigned a value of Calibration 6 (Task 21). If the engine was last operated on the gaseous fuel (i.e. the Last_Engine_Run_Used_Gasoline_Flag is clear), the Hot_Restart_Flag is evaluated (Decision 20). If the Hot_Restart_Flag is set, End_Ref_Pulse is assigned a value from Table 3 based on Soak_Time (Task 23). If the Hot_Restart_Flag is clear, End_Ref_Pulse is set equal to Calibration 7 (Task 22).

At Task 24, the value of End_Ref_Pulse is finalized by applying a multiplier, obtained from Table 4, which is based on barometric pressure:

$$\text{End\_Ref\_Pulse} = \text{End\_Ref\_Pulse} \times \text{Table 4(Barometric\_Pressure)}$$

Actual calculation of the ramp-in period for supplemental gasoline fueling (Ramp_In_Period) begins at Decision 25 with the evaluation of the Last_Engine_Run_Used_Gasoline_Flag. If the flag is set, indicating that the engine was last operated on gasoline, Ramp_In_Period is assigned a value of Calibration 8 (Task 27). If the engine was last operated on the gaseous fuel (i.e. the Last_Engine_Run_Used_Gasoline_Flag is clear), the Hot_Restart_Flag is evaluated (Decision 26). If the Hot_Restart_Flag is set, Ramp_In_Period is assigned a value from Table 5 based on Soak_Time (Task 29). If the Hot_Restart_Flag is clear, Ramp_In_Period is set equal to Calibration 9 (Task 28). At Task 30, the value of Ramp_In_Period is finalized by applying a multiplier, obtained from Table 6, which is based on barometric pressure:

$$\text{Ramp\_In\_Period} = \text{Ramp\_In\_Period} \times \text{Table 6(Barometric\_Pressure)}$$

At Decision 31, the following evaluation is made:

$$\text{Curr\_Ref\_Pulse} < (\text{Start\_Ref\_Pulse} + \text{Ramp\_In\_Period})$$

If the evaluation is true (i.e. if the gasoline fuel is still being ramped-in), Gas_Assist_PW is calculated as follows at Task 33:

$$\text{Gas\_Assist\_PW} = \text{Normal\_PW} \times \frac{\text{Curr\_Ref\_Pulse} - \text{Start\_Ref\_Pulse} + 1}{\text{Ramp\_In\_Period} + 1}$$

If the evaluation at Decision 31 is false (i.e. the ramp-in of gasoline fuel is complete), Gas_Assist_PW is calculated as follows at Task 32:

$$\text{Gas\_Assist\_PW} = \text{Normal\_PW}$$

It may not be desirable to ramp-in fuel under all start conditions. As an example, for gaseous fuel starts following gasoline engine operation, it would not normally be desirable to ramp-in the supplemental gasoline fuel. For this case, Calibration 8 can be set to zero, thereby eliminating the ramp-in period. The ramp-in period for other start modes can be similarly eliminated by setting the appropriate Calibration to zero (i.e. Calibration 9 or entries in Table 5 or Table 6).

At Decision 34, Curr_Ref_Pulse is compared to End_Ref_Pulse. If Curr_Ref_Pulse is greater than or equal to End_Ref_Pulse, signifying that the end point of supplemental gasoline fueling has been reached, algorithm execution proceeds to Decision 35 where the gasoline fueling decay calculations begin. If Curr_Ref_Pulse is less than End_Ref_Pulse, the decay calculations are skipped and algorithm execution proceeds to Decision 43.

Calculation of the supplemental gasoline fueling decay begins at Decision 35 with the evaluation of the Last_Engine_Run_Used_Gasoline_Flag. If the flag is set, indicating that the engine was last operated on gasoline, Decay_Period is assigned a value of Calibration 10 (Task 37). If the engine was last operated on the gaseous fuel (i.e. the Last_Engine_Run_Used_Gasoline_Flag is clear), the Hot_Restart_Flag is evaluated (Decision 36). If the Hot_Restart_Flag is set, Decay_Period is assigned a value from Table 7 based on Soak_Time (Task 39). If the Hot_Restart_Flag is clear, Decay_Period is set equal to Calibration 11 (Task 38). At Task 40, the value of Decay_Period is finalized by applying a multiplier, obtained from Table 8, which is based on barometric pressure:

$$Decay\_Period = Decay\_Period \times Table8(Barometric\_Pressure)$$

At Decision 41, the following evaluation is made:

$$Curr\_Ref\_Pulse < (End\_Ref\_Pulse + Decay\_Period)$$

If the evaluation at Decision 41 is false (i.e. the ramp-out of gasoline fuel is complete), Gas_Assist_PW is set to zero (Task 50), and the algorithm is exited. If the evaluation is true (i.e. if the gasoline fuel is still being ramped-out), Gas_Assist_PW is calculated as follows at Task 42:

$$Gas\_Assist\_PW = Normal\_PW \times \frac{Decay\_Period + End\_Ref\_Pulse - Curr\_Ref\_Pulse}{Decay\_Period + 1}$$

Calculation of Gas_Assist_Mult begins with Decision 43. Gas_Assist_Mult is a variable containing the fraction of normally delivered gasoline fuel (i.e. the injector pulse width that would be commanded during a conventional gasoline start) to be delivered during a gaseous fuel start. If the Last_Engine_Run_Used_Gasoline_Flag is set, indicating that the engine was last operated on gasoline, Gas_Assist_Mult is assigned a value of Calibration 12 (Task 45). If the engine was last operated on the gaseous fuel (i.e. the Last_Engine_Run_Used_Gasoline_Flag is clear), the Hot_Restart_Flag is evaluated (Decision 44). If the Hot_Restart_Flag is set, Gas_Assist_Mult is assigned a value from Table 9 based on Soak_Time (Task 47). If the Hot_Restart_Flag is clear, Gas_Assist_Mult is set equal to Calibration 13 (Task 46). At Task 48, the value of Gas_Assist_Mult is modified by applying a multiplier based on barometric pressure that is obtained from Table 10:

$$Gas\_Assist\_Mult = Gas\_Assist\_Mult \times Table\ 10(Barometric\_Pressure)$$

At Task 49, the value of Gas_Assist_Mult is further modified by applying a multiplier, obtained from Table 11, which is based on start-up coolant temperature:

$$Gas\_Assist\_Mult = Gas\_Assist\_Mult \times Table\ 11(Start\_Up\_Coolant\_Temp)$$

At Task 51, the value of Gas_Assist_Mult is limited to a value of 1.0. This is done to prevent the delivery of more gasoline fuel than would normally be delivered during a conventional gasoline start.

At Task 52, the final value of Gas_Assist_PW is calculated as follows:

$$Gas\_Assist\_PW = Gas\_Assist\_PW \times Gas\_Assist\_Mult$$

Although the preferred algorithm start strategy as described herein is intended for use in a bi-fuel engine designed primarily for running on CNG, the invention scope exceeds the latter limitation, as will be appreciated by those skilled in the art.

What is claimed is:

1. A method of introducing and controlling a calibrated quantity of liquid gasoline into the gaseous fuel start cycle of a bi-fuel engine comprising the steps of:
   a) determining whether last engine operation was based upon gaseous or gasoline fuel;
   b) measuring length of time said engine has been shut down since last operating cycle;
   c) determining and calibrating amount of gasoline fuel to be supplied during next engine starting cycle based upon steps a and b.

2. The method of claim 1 further comprising:
   calculating a pulse width representative of said calibrated amount of gasoline fuel to be supplied.

3. The method of claim 2 further comprising an electronic control module for carrying out said determinations and calibrations for said fuel calculation.

4. The method of claim 3 wherein a cold start-up comprises an engine start that occurs after engine shutdown, and after residual gaseous fuel in an engine intake system has substantially diffused, and wherein a hot start-up comprises an engine start occurring after shutdown, but prior to diffusion of said residual gaseous fuel.

5. The method of claim 4 wherein said electronic control module is responsive to soak time between engine runs, and further comprises capacity to differentiate between gaseous fuel start-up classifications as being either hot or cold startups.

6. The method of claim 5 wherein said electronic control module determines whether the fuel operating cycle prior to last shutdown was of gaseous or gasoline fuel, and wherein said calibration of supplemental gasoline fuel is determined as a function thereof.

7. The method of claim 6 wherein the amount of supplemental gasoline fuel delivered to the engine is a fraction of the amount of gasoline normally delivered during a conventional gasoline startup of said bi-fuel engine.

8. The method of claim 7 wherein said supplemental fuel is applied over a period that includes a ramp-in period and a decay period.

9. The method of claim 8 wherein the calibration of said supplemental fuel delivery period is a function of barometric pressure and startup coolant temperature.

10. The method of claim 9 wherein said electronic control module comprises calibration criteria for said hot and cold startup classifications, and wherein said module further compensates for engine manifold geometry.

11. The method of claim 9 wherein said electronic control module comprises capability for compensating said hot and cold startup classifications irrespective of engine manifold geometry.

12. The method of claim 8 wherein said electronic control module further comprises a series of adjustable calibration tables.

13. A method of calculating and then introducing a calibrated quantity of liquid gasoline into the gaseous fuel start cycle of a bi-fuel engine that alternately runs on gasoline or gaseous fuel, comprising the steps of:
   a) determining whether last engine operation was based upon gaseous or gasoline fuel;
   b) measuring length of time said engine has been shut down since last operating cycle;
   c) determining and calibrating amount of gasoline fuel to be supplied during next engine starting cycle based upon steps a and b; and then
   d) calculating a fuel injector pulse width representative of said calibrated amount of gasoline fuel to be supplied.

14. The method of claim 13 further comprising an electronic control module for carrying out said determinations, calibrations, and said fuel injector pulse width fuel calculation.

* * * * *